(12) United States Patent
Nguyen

(10) Patent No.: US 10,980,324 B2
(45) Date of Patent: Apr. 20, 2021

(54) RECEPTACLE WITH MULTIPLE OPENINGS FOR CONCEALING A SCREEN OF A MOBILE ELECTRONIC DEVICE AND PERMITTING A USER TO ACCESS AND CONTROL THE MOBILE ELECTRONIC DEVICE HOUSING INSIDE THE POUCH AT THE DISCRETION OF THE USER

(71) Applicant: John Nguyen, Lake Elsinore, CA (US)

(72) Inventor: John Nguyen, Lake Elsinore, CA (US)

( * ) Notice: Subject to any disclaimer, the term of this patent is extended or adjusted under 35 U.S.C. 154(b) by 0 days.

(21) Appl. No.: 16/712,957

(22) Filed: Dec. 12, 2019

(65) Prior Publication Data

US 2020/0170366 A1 Jun. 4, 2020

(51) Int. Cl.
*A45C 13/02* (2006.01)
*A45C 11/00* (2006.01)
*H04B 1/3888* (2015.01)

(52) U.S. Cl.
CPC .............. *A45C 13/02* (2013.01); *A45C 11/00* (2013.01); *H04B 1/3888* (2013.01); *A45C 2011/002* (2013.01); *A45C 2013/025* (2013.01); *A45C 2013/026* (2013.01)

(58) Field of Classification Search
CPC ... A45C 11/00; A45C 13/02; A45C 2011/002; A45C 2013/025; A45C 2013/026; B65D 85/00; B65D 85/30; G06K 19/00; G06K 19/005; G06K 19/07; H04M 1/00; H04M 1/18; H04M 1/667; H04M 1/725; H04M 1/72577; H04W 12/08; H04W 24/00; H04B 1/38; H04B 1/3888
USPC ...................................... 206/320, 484–484.2
See application file for complete search history.

(56) References Cited

U.S. PATENT DOCUMENTS

| | | | | |
|---|---|---|---|---|
| 6,763,942 B1 * | 7/2004 | Yeh | ........................ | G06F 1/1628 206/320 |
| 8,544,640 B1 * | 10/2013 | Hilton | ..................... | A45C 13/02 206/45.24 |
| 8,770,403 B2 * | 7/2014 | Kuo | ........................ | A45C 11/00 206/320 |
| 9,819,788 B2 * | 11/2017 | Dugoni | .................. | H04M 1/667 |
| 10,623,957 B2 * | 4/2020 | Dugoni | ................ | H04B 1/3888 |
| 2005/0279660 A1 * | 12/2005 | Deflin | .................. | A41D 27/205 206/320 |

(Continued)

FOREIGN PATENT DOCUMENTS

CN 206699640 U * 12/2017

*Primary Examiner* — Bryon P Gehman

(57) ABSTRACT

An receptacle with openings for concealing a screen of a mobile electronic device and permitting a user to access and control the mobile electronic device at the discretion of a user is a pouch comprising a color-coded shell with multiple openings and a chamber to house the mobile electronic device therein; and a dividing mechanism that may be engaged or disengaged for converting between a single opening and two openings so that a user may access and control the device housed inside the pouch when the dividing mechanism is engaged. Furthermore, engaging the dividing mechanism may be disengaged by a user or a supervisor with a detacher. A pouch has various colors to represent pre-determined conditions at the discretion of supervisors of an area so they would know which pouch to disengage base on its color. Lastly, the shell of the pouch is constructed from a rectangular sheet of fabric for environmental and cost-saving benefits.

1 Claim, 10 Drawing Sheets

(56) References Cited

U.S. PATENT DOCUMENTS

| | | | | |
|---|---|---|---|---|
| 2008/0202958 A1* | 8/2008 | Hanlen | ............... | B65D 85/30 |
| | | | | 206/320 |
| 2010/0102084 A1* | 4/2010 | Clark | ............... | H01H 9/0242 |
| | | | | 206/320 |
| 2012/0187003 A1* | 7/2012 | Stewart | ............... | B65D 5/4291 |
| | | | | 206/216 |
| 2013/0118935 A1* | 5/2013 | Zar | ............... | A45C 11/00 |
| | | | | 206/320 |

* cited by examiner

RECEPTACLE WITH MULTIPLE OPENINGS FOR CONCEALING A SCREEN OF A MOBILE ELECTRONIC DEVICE AND PERMITTING A USER TO ACCESS AND CONTROL THE MOBILE ELECTRONIC DEVICE HOUSING INSIDE THE POUCH AT THE DISCRETION OF THE USER

CROSS-REFERENCE TO RELATED APPLICATIONS

Not applicable

GOVERNMENT CONTRACT

Not applicable

STATEMENT OF FEDERALLY SPONSORED RESEARCH OR DEVELOPMENT

Not applicable

NAMES OF JOINT RESEARCH AGREEMENT

Not applicable

REFERENCE TO A SEQUENCE LISTING

Not applicable

BACKGROUND OF THE INVENTION

Mobile electronic devices such as smartphones and smartwatches have become today's one of most convenient and beneficial devices. We use the mobile electronic devices to connect with others, access information, and record information. Furthermore, a user may access and control the device to make calls and answer calls with a click on a button, a tap on a screen, and/or make some commands. However, pervasive usages of the mobile electronic devices in schools, meetings, workplaces, and other events are distracting users from their tasks. The content on a screen of the mobile electronic device are distracting and addictive. For example, many apps, games, videos, music, social media, eBooks, and many other sources of media may be stored, viewed, or controlled on the screen of the mobile electronic device. When a user interacts with media, apps, games, and other content on the screen of the mobile electronic device, a user is distracted from their tasks. For example, pervasive use of the device at schools and home distracts students from their learning tasks; consequently, this causes students to underperform academically in schools. To further illustrate, teachers are constantly reminding students to put their devices away during class; however, it is deficient and ineffective because there are too many students for a single teacher to facilitate daily. At schools, the mobile electronic device may be used as a weapon to cyberbully others, promote and record fights, and view inappropriate-age content. Similarly, a user of the mobile electronic device at workplaces, meetings, conferences, informational events are distracted by contents on the screen of the mobile electronic device; consequently, this decreases performance, productivity, and comprehension of the user. More importantly, a user may only fully enjoy the content on the screen if a user can view the entire screen of the mobile electronic device continuously over a long period of time; therefore, limit a user the ability view the entire screen continuously may cause a user not to use the device at all.

At the same time, however, a user of the mobile electronic device may need to access and control of the mobile electronic device at the discretion of a user to answer calls or make calls during unexpected disasters, emergency, or life-threatening events. To illustrate, an ability of a user to make calls and answer calls during a life-threatening event such as terrorist attacks or active shooting at an event or in an area is lifesaving and time-critical. Also, there is a rise in active shooting at schools and communal events and many natural disasters such as flood, earthquakes, and fire.

Attempts have been made to provide a balanced solution for eliminating distraction from using a mobile electronic device and permitting a user to access and control the device at the same time. However, none of those in existence provide an efficient solution that provide a balance between eliminating distraction on a screen the and permitting a user to access and control the device, at the discretion of a user, to make lifesaving and time-critical functions. For example, U.S. Pat. No. 9,819,788 to Dugoni discloses a "system and apparatus for selectively limiting user control of a mobile electronic device." However, this solution is deficient because it "renders the electronic device inaccessible and incontrollable" when locking of the device inside the case is engaged. The front and rear plates of the opening of the case of U.S. Pat. No. 9,819,788 almost sealed the opening, making the contained device "physically impenetrable by the user of the mobile device." The U.S. Pat. No. 9,819,788 further discloses that locking a mobile device in a case so that the mobile device is "physically impenetrable by the user of the mobile device" when "locking is engaged" under circumstances such as geographic location or timing. The U.S. Pat. No. 9,819,788 also further discloses that "locking [means] may first render the electronic device inaccessible to the user . . . and second non-disengageable by the user of the mobile device until predetermined condition is met." The U.S. Pat. No. 9,819,788 further discloses that "a locking means for at least partially securing the opening so the mobile device electronic device is may be rendered inaccessible to and further incontrollable by the user of the device although it may still remain in his possession." This solution focus specifically for "communal events such as a show, demonstration, display, athletic competition, or concerts within a concert hall, center, arena, or similar venue." In such scenarios, the "locking [of apparatus] means may only become disengageable if a user leaves the venue." In an school setting, meeting, conferences, work places, and other events or area, it is essential for a user to access and control the device to answer calls, make calls, record audio, charge the device, make calls, make commands, listen to audio, connect to USB ports, and other functions at the discretion of the user. Especially in school setting, K-12 students may need, at the discretion of a user, to answer calls and make calls throughout the day. Likewise, a user in a learning or informational setting or events (such as, class lecture, important conference, and meeting) may want to access and control the device to record audio of information presented. More importantly, there is an increasing shootings at communal events and areas such as schools, classrooms, concerts, sport stadium, religious gathering, or other groups events; therefore, user of the mobile electronic device needs to have quick access and control of the mobile electronic device at the discretion of the user to answer calls and make calls. This deficiency is furthered demonstrated by current users of U.S. Pat. No. 9,819,788. For example, Haleigh Lewis wrote that "students cannot access [their phones]

because they are sealed in the pouch". Also, Adam Maida from WIRED wrote that "locking [phones in a pouch] rendering it totally inaccessible." Currently, to disengage locking of the U.S. Pat. No. 9,819,788, a user needs to find a designated supervisor who has a designated and proprietary key of U.S. Pat. No. 9,819,788 to manually disengage the locking of the case; more importantly, only one case can be disengaged at a time by a key of the case. Therefore, during emergency situations such earthquakes, flood, fire, on-site shooting, terrorist attacks, and other unexpected disaster or events; it is dangerous and inefficient to disengage each case at time when there too are many people who need their case of U.S. Pat. No. 9,819,788 to be unlocked. During such life-threatening disasters and events, a user of the device needs instant access and control the device to answer phone calls and make phone calls quickly to get helps, without first required the locking of the case to be disengaged.

Likewise, another safety concern that U.S. Pat. No. 9,819,788 failed to address is the sharp point from an object of its locking mechanism. The sharp point of the locking mechanism's article is facing outward toward a user and others when the locking mechanism is not engaging. In a communal events or school setting with many minor users, or children, this poses a bodily-injury hazard for children.

Likewise, other attempts are also ineffective. A common solution is having signs to remind a user of the mobile electronic device to put it away. For example, a teacher has signs and reminds students to put the device away, and the teacher may confiscate students' mobile electronic devices if the student has it out habitually. Consequently, a teacher's instructional time are wasted to remind students to put the devices away, or a teacher gives up and lets a student continues to be distracted by the content on the mobile electronic device. Overall, it is extremely burdensome and ineffective because there are too many students in a classroom for a single teacher to identify and remind daily.

Although various inventions and proposals have been made, none of those in existence provide an efficient solution that provide a balance between eliminating distraction on a screen the and permitting a user to access and control the device, at the discretion of a user, to make life-saving and time-critical functions, such as but not limited to, answer calls, make calls, unlock with fingerprint, record audio, make commands, connect to ports, and other functions of the device. During unexpected and life-threatening disaster and emergency, a user needs to access and control the device to get help or being informed. Therefore, there remains a need for a utility that provide this balance of eliminating of distraction on the mobile electronic device's screen and permitting a user to access and control of the device at the discretion of a user. The absence of such utility will continue to negatively affect users' performance in schools and users' productivity at workplaces. At the same time, we are putting a user, especially for minor users, in danger when they cannot quickly access and control their device during unexpected or life-threatening disasters or events. This disclosed invention will provide an efficient solution that provide a balance solution between eliminating distraction of the electronic device and permitting a user instant access and control the device, at the discretion of the user, to answer calls, make calls, unlock with fingerprint, record audio, make commands, and connect to ports even when device is contained inside this disclosed invention. Altogether, this disclosed invention may positively increase users' academic performances, decrease cyberbully, improve user' mental and physical beings while a user can access and control the device, at the discretion of a user, even when it's being housed inside the disclosed invention.

BRIEF SUMMARY OF THE INVENTION

The present invention is a receptacle with multiple openings for concealing a screen of a mobile electronic device and permitting a user to access and control the mobile electronic device housed inside the pouch at the discretion of the user. Wherein, this disclosed invention is a color-coded pouch with multiple openings for concealment of the screen of the mobile electronic device and permitting the user to access and control the device, at the discretion of the user, to perform essential functions such as, but not limited to, answering calls, making calls, unlocking with fingerprint, recording audio, making commands, and connect to ports when device is housing inside the pouch.

For the purpose of summarizing, important advantages and novel features of disclosed invention are described and can be further understood by looking at drawings. More importantly, it is understood that the drawings are drawn from photographs of the tangible and constructed prototype of the invention to demonstrate the novelty of the invention from realistic perspectives and depictions so that persons with skills in the related arts can reproduce the disclosed invention for described applications.

One of the novel features and advantages of this invention the method of constructing the entire shell the color-coded pouch comprising mainly a rectangular sheet of fabric for environment and cost-saving benefits by producing minimal waste of material. First, at least one or more cut on the sheet of fabric is made to create an opening to permit a user to access and control of the device at the discretion of the user. Then, a small rectangular piece of fabric that are larger than the cut is stitched on top and around the cut area to strengthen the cut area and corners. The rectangular shape of fabric allows cutting sheets of fabric from rolls with minimal or zero material waste and with little time and labor.

After any additional opening is constructed, a portion of the fabric is folded longitudinally from the top to make two connected sheets of fabric. Then, two connected sheets are aligned and punctured to make a hole on each sheet. Furthermore, it's contemplated that holes may be pre-molded by a fabric manufacturer during process of manufacturing the larger rectangular sheet of fabric. Therefore, this further reduce material waste and altogether provide more environmental and cost-saving benefits.

The size and locations of two holes allow the flat surface of an article of the dividing mechanism that houses the rod to lay almost flat against the flat side of the two connected sheets of fabric. This flat and direct contact between the surfaces of the article and two sheets of fabric increase glue adhesion of the article in between the two sheets of fabric, resulting the article to be glued in one place. Next, the other article of the dividing mechanism that is comprising a rod with sharp point elongated from a flat base is protruded through the shorter sheets of fabric, and flat base is trapped between the two sheets of fabrics. Then, the flat base is glued and trapped in between the two connected sheets of fabric. Then, stitches are made between the two sheets of fabric and around each articles of the dividing mechanism to further secure the two articles in their locations. Furthermore, the two connected sheets are permanently stitched laterally near the top and bottom edges of folded portion.

Then, this modified sheet of fabric comprising glued and stitched articles of the dividing mechanism is folded and stitched on one lateral edge and one longitudinal side edge to form the pouch; wherein the pouch has an opening to a chamber. Lastly, the pouch is turned inside out to hide thread, stitches, and cutting edges inside the inside of the pouch become the outside surface of the pouch.

Another novel feature and advantage of this invention is the safety features of the color-coded pouch. Most of the users of the pouch are predominantly comprising minor users and children in schools. One critical safety concern is the sharp point of the rod of the article of the dividing mechanism. When multiple users in a small closed setting like classrooms, multiple sharp points may poke users if it's not handled with care. Likewise, disruptive and misbehave children may use the rods as weapons to poke other children. To address this safety concern, the rod is placed, glued, and stitched between two thick sheets of fabric; hence, reduce the overall length of the rod. Furthermore, the two sheets trap the article with rod so that it located deep inside and below the opening of the pouch. Most significantly, the sharp point is naturally pointed to toward inside after the pouch is turned inside out. Furthermore, a warning label with symbols and words is heat pressed onto each pouch to remind a user to handle the pouch with care.

Another novel features and advantage of the invention is the dividing mechanism for convert a single opening into two openings, or vice versa. Unlike a locking mechanism, which focus on sealing and securing an opening; a dividing mechanism comprises a thin rod to divide a single opening into two openings with little loss to the total sizes of the overall openings. An analogous example of this novel feature is like drawing a line through a circle to create two semi-circles. Another analogous example would be taking circle rubber band and twist to produce two circles. Overall, this dividing mechanism may be engaged or disengaged to convert between a single opening and two openings, or vice versa; and whereby the dividing mechanism create opening that permit user to access and control the mobile electronic device housing inside the pouch at the discretion of the user.

To further permit a user to access and control the mobile electronic device housing inside the pouch at the discretion of the user, at least one additional opening is creating by making at least one cut on the sheet of fabric. For example, a lateral cut is made on the pouch, and it's covered and stitched to another sheet of fabric to strengthen the cut areas and corners, giving a user instant access and control to the mobile electronic device. This additional opening accommodates the variations of designs of different mobile electronic devices.

Furthermore, the pouch comprises stretchable fabric that allow a user to turn the mobile electronic device housing inside the pouch so that the user of the mobile electronic device an access and control the device, at the discretion of a user, to answer calls, make calls, control other functions.

Another novel feature and advantage of the invention is the variations of colors of the pouch to indicate different pre-determined conditions that are needed to meet so that a supervisors of an area or event would know which pouch to disengage by based on the color of the pouch. Since the pouch is primarily designed and invented as solutions to solve the distraction of mobile electronic device in schools, the variations of color is a novel feature that allow teachers and school staffs to use the pouch as a positive and negative reinforcement tool to reward or punish students in order to promote positive behaviors and excellent academic performance. To illustrate with a specific example, but the applications of the invention is not limited by this example, the current pouches come in two color, orange and blue. The blue color of the pouch represents the standard and normal expectations for all students; such as, the blue pouch is use within a class period so that students put the device at the beginning of class and remove it at the end of class. Also, a blue pouch also represents a pre-determined condition that would inform the staffs that it would be appropriate to disengage the attachment mechanism at any time or anywhere at the discretion of staffs. Therefore, staffs such as teachers may reward users by disengage the dividing mechanism and allow students to view and interact with entire screen of the mobile electronic device after students have completed assigned tasks, performed well on assessments, or demonstrated positive behaviors. Overall, blue color of the pouch serves as a tool to reward students to promote positive behaviors. On the contrary, an orange color of the pouch represents a predetermined condition that informed supervisor and school staffs that a student was punished for a wrongful behavior; therefore, the orange pouch would only be disengage by school administrators. That is, users with an orange pouch has lost the normal privilege of gaining the rewards to and interact with the entire screen of the mobile electronic device. Overall, the orange color of the pouch is used as a tool to punish a user for their inappropriate behaviors. Therefore, this form of behavioral intervention allows teachers and school leaders to improve students' behaviors throughout school, which is a positive alternative to class suspensions or school suspensions. More importantly, this form of intervention is an important tier of intervention and support in the Multi-Tiered System of Support and Positive Behavioral Intervention System. Altogether, the different colors of the pouch may improve school's overall culture positively and improve users' academic and behavioral performance.

DETAILED DESCRIPTION

Figure 1:
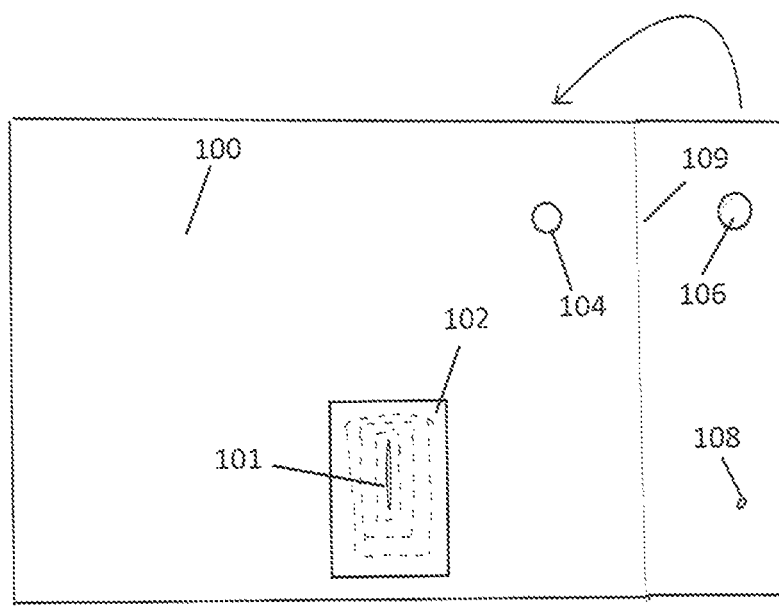
FIG. 1 is a schematic view the rectangular sheet fabric with a lateral cut on the sheet, two holes, a folding line, and locations of articles of the dividing mechanism.

Having summarized various advantages and novel features of the present invention, reference will now be described in detail, as illustrated in the drawings, to cover all the alternatives and modifications of the invention defined by the claims of this invention.

Figure 2:
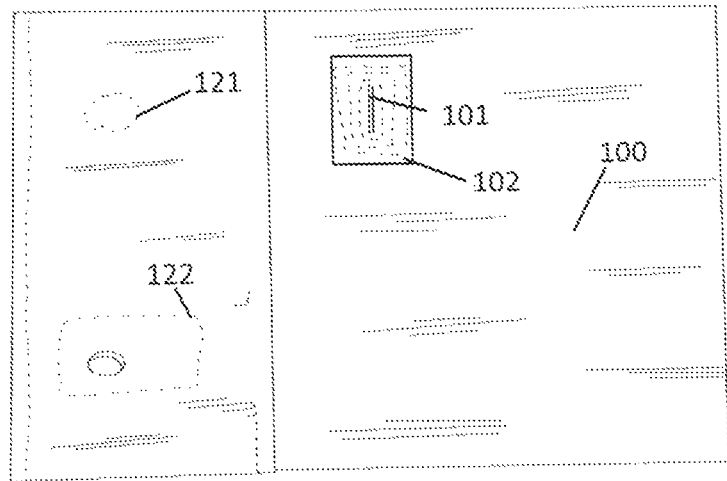
FIG. 2 is a top view of a folded sheet of fabric that form two connected sheets, a lateral cut, locations of articles of the dividing mechanism, and two connected sheets are stitched laterally below the folding line.
Figure 3:
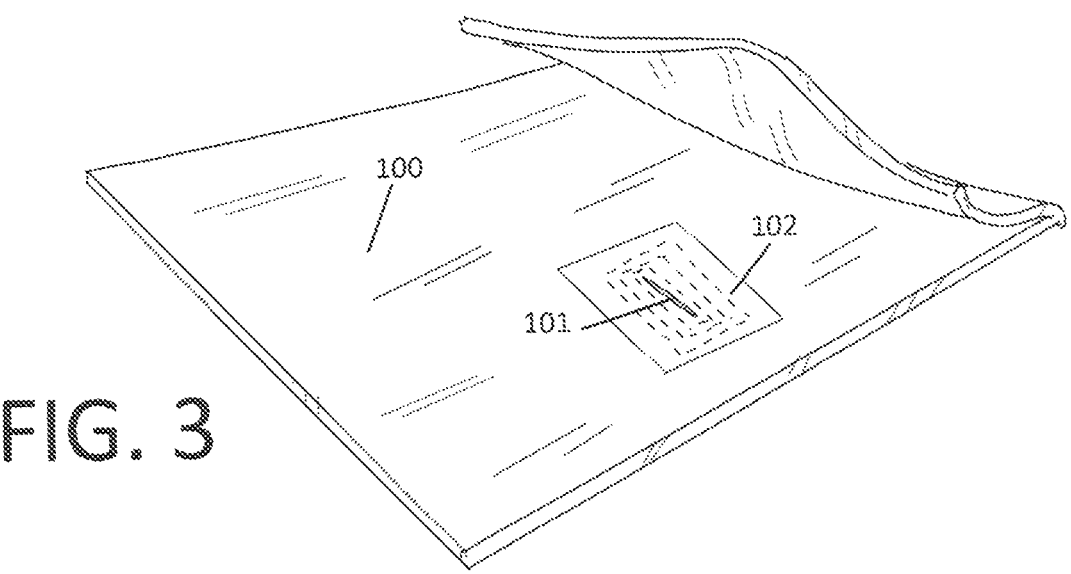
FIG. 3 is a perspective view of the sheet of fabric is folded to create two connected sheets of fabric.

With reference to FIGS. 1-3, the receptacle with multiple openings for concealing the screen of the mobile electronic device and permitting a user to access and control the device mobile electronic device 114 housing inside, at the discretion of a user, is the color-coded pouch 107 that is constructed using a method that comprises a rectangular sheet of fabric. FIGS. 1-3 illustrates a method of constructing the pouch with a lateral cut 101. FIG. 1 illustrated a schematic view of the rectangular sheet fabric 100 with a lateral cut 101 on the sheet that is covered and stitched to another rectangular sheet fabric 102. FIG. 1 also illustrated a rectangular sheet 100 comprising of two holes 104 and 106, a folding line 109, and locations of articles of the dividing mechanism. FIG. 3 illustrates folding the sheet of fabric 100 make two connected sheets of fabric. FIG. 2 illustrates the next step of production, during which the sheet of fabric is folded at the folding line 109 to create two connected sheets that are ready to glue to the two articles of the dividing mechanism at their locations 121 and 122. The size and locations of two holes allow the flat surface of the article 110a of the dividing mechanism that houses the rod to lay almost flat against the flat side of the two connected sheets of fabric. This flat and direct contact between the surfaces of the article and two sheets of fabric increase glue adhesion between the article in between to sheets of fabric, resulting the article 110a to be trapped and glued in between the two connected sheets of fabric. Therefore, the only parts of the article 110a that are exposing through the two holes of the sheets of fabric is an opening to the article 110a to receive and house rod 111. At the location 121 for the article 110b of the dividing mechanism, the rod 111 is protruded through the shorter sheet of fabric and its base 112 is trapped and glued in between the two connected sheets of fabric. After the two articles of the dividing mechanism is glued in between the two connected sheets of fabric, stitches are made between the two connected sheets of fabric and around the articles. Then, the two connected sheets of fabric are permanently stitched laterally at the bottom edge.

Figure 4:
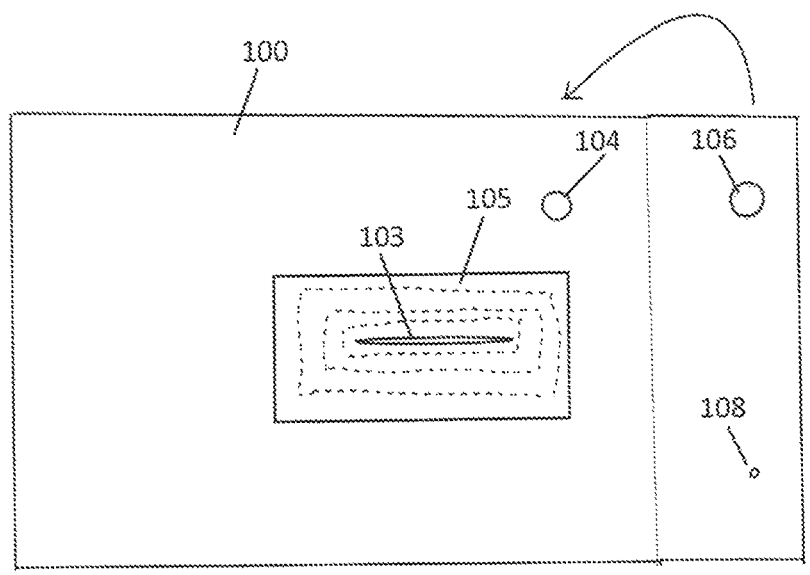
FIG. 4 is a schematic view the rectangular sheet fabric with a longitudinal cut on the sheet, two holes, a folding line, and locations of articles of the dividing mechanism.
Figure 5:
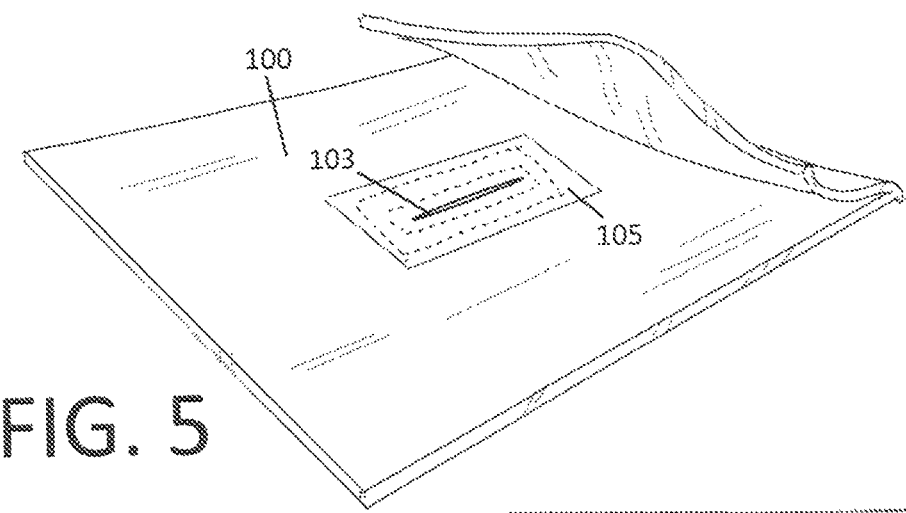
FIG. 5 is a perspective view of the sheet of fabric is folded to make two connected sheets of fabric to form a pouch with a longitudinal cut.
Figure 6:
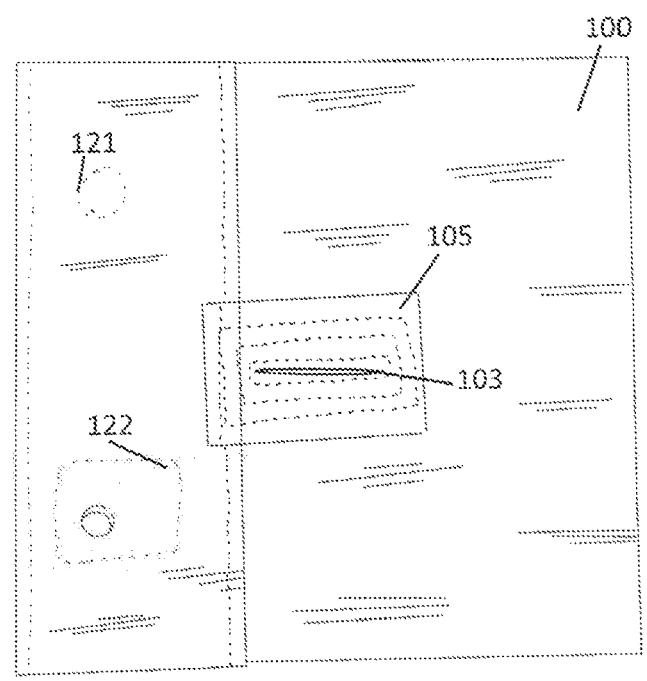
FIG. 6 is a top view of a folded sheet of fabric with reinforced a longitudinal cut, locations of articles of the dividing mechanism, and two connected sheets are stitched laterally below the folding line.

FIGS. 4-6 illustrates a method of constructing the pouch with longitudinal cut 103. The method is like the method illustrated in FIGS. 1-3. FIG. 4 illustrate a schematic view of the rectangular sheet of fabric 100 with a longitudinal cut 103 on the sheet that is covered and stitched to another rectangular sheet fabric 102. FIG. 4 also illustrated a rectangular sheet 100 comprising of two holes 104 and 106, a folding line 109, and locations of articles of the dividing mechanism. The similarity of methods illustrated in FIGS. 1-3 and FIGS. 4-6 present an embodiment that different locations of one or more cuts on the rectangular sheet of fabric does not significantly change overall process of constructing a pouch from rectangular sheets of fabric, including the method of trapping and gluing the articles of the dividing mechanism in between the two connected sheets of fabric.

Figure 7:
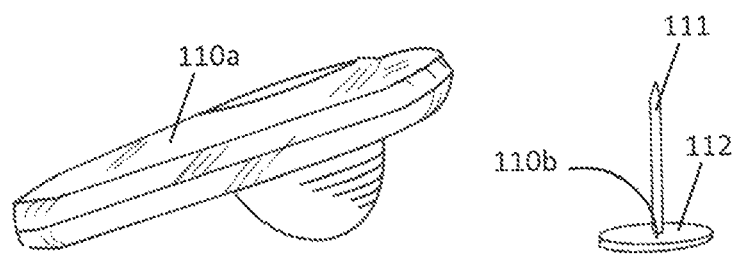
FIG. 7 is a perspective view of the two articles that make up the dividing mechanism.
Figure 8:
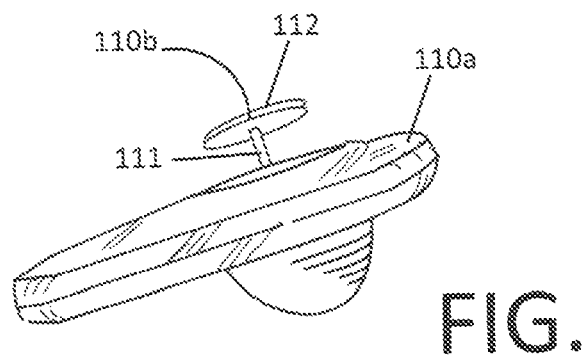
FIG. 8 is a perspective view of the two articles of the dividing mechanism is engaging.
Figure 9:
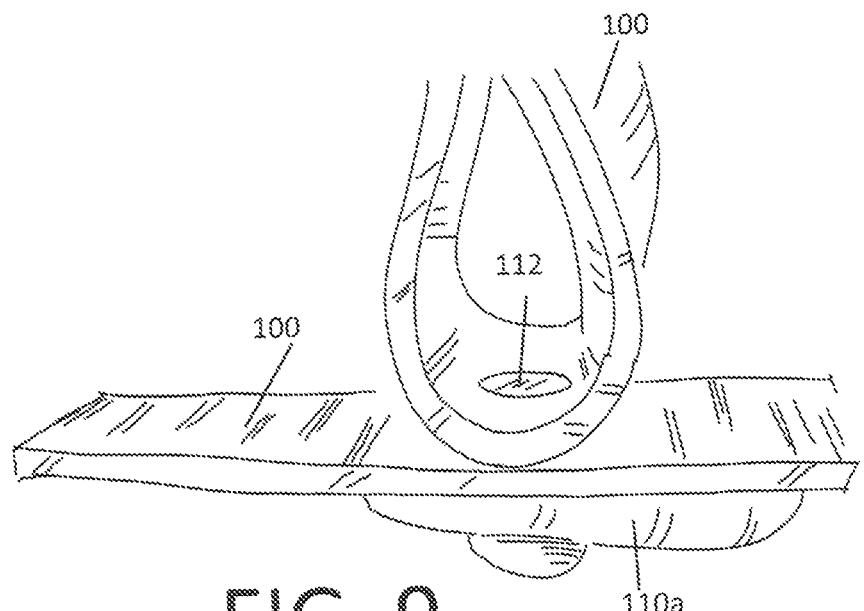
FIG. 9 is a perspective view that shows the dividing mechanism converted a single opening into two openings when it is engaging.

With references to FIGS. 7-9, the dividing mechanism of the pouch converts between a single opening and two openings, or vice versa. With reference to FIGS. 7-8, the dividing mechanism comprising an article 110b with a sharp point rod 111 elongate from flat base 112, whereby the rod 111 insert and house in receiving article 110a to engage the dividing mechanism. FIG. 9 illustrated the engagement of the dividing mechanism divide a single opening into two openings, a left opening and a right opening separated by the rod 111. The thin rod 111, small circular base 112, and stretchable sheet of fabric 100 minimize the loss of the total sizes of the openings, and the fabric can be stretched to increase the sizes of the openings.

Figure 10:
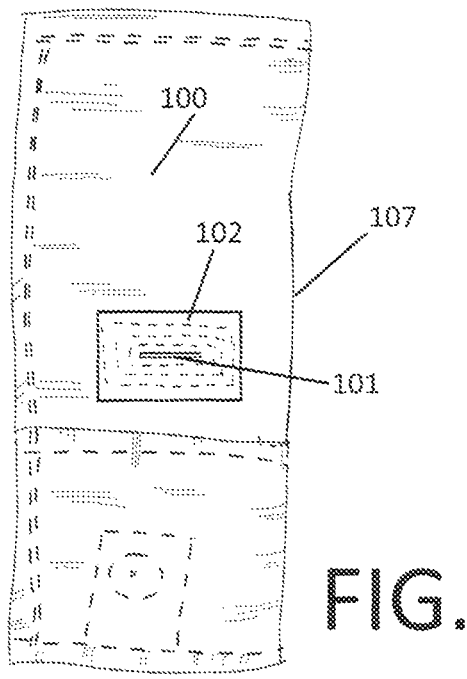
FIG. 10 is a perspective of the pouch formed from folding the sheet of fabric laterally and permanently stitched one lower lateral edge side and one longitudinal edge side.
Figure 11:
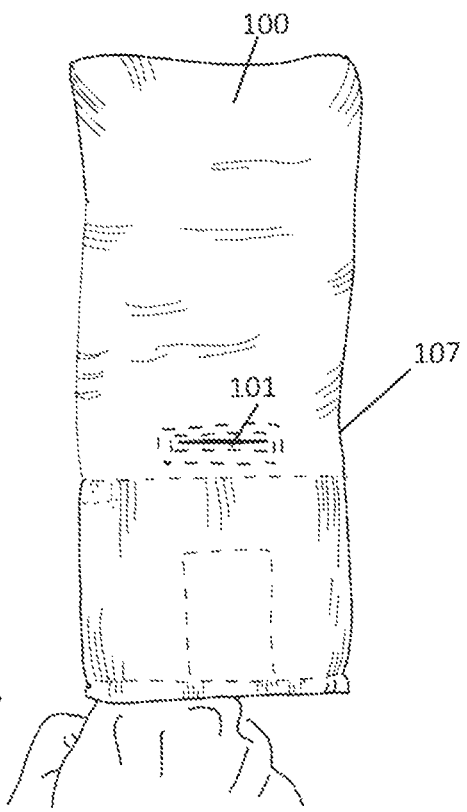
FIG. 11 is a perspective view of the pouch that is turned inside out, and the dividing mechanism is engaging while a user is accessing and controlling the mobile electronic device housing inside the pouch.

With reference to FIG. 10, a modified rectangular sheet of fabric with at least one reinforced cut and the glued articles of the dividing mechanism is folded laterally and permanently stitched at the lower lateral edge side and one longitudinal edge side to form a pouch. FIG. 10 illustrates the pouch before it is turned inside out, so the cutting edges of fabric, lines of stitches, and the smaller sheet of fabric that strengthens the cut is on the outside. Most importantly, the rod 111 is still pointing outward. The embodiment in FIG. 10 is turned inside out to become the embodiment illustrated in FIG. 11. With reference to FIG. 11, turning the pouch inside out hides all the edges and lines of stitches inside the pouch, changes directions of article 110a and the sharp point of article 110b to face toward each other and toward the inside of the pouch; furthermore, the outside surface of the pouch comprises predominantly a single color. Using fabric of different colors, pouches of different color can be made so that the color of the pouch is color-coded. This embodiment of the pouch comprising different uniform colors by using fabric of different colors permits the variations of colors of the pouch to indicate different pre-determined conditions that are needed to meet so that a supervisor of an area or event would know which pouch to disengage by based on the color of the pouch. To illustrate, the current pouches come in two color, orange and blue. However, the limitation of black and white drawings makes it impossible to illustrate the different colors.

Furthermore, the side of the pouch that is comprising article 110b of the dividing mechanism now has the sharp point located deep below the opening and inside the chamber of the pouch; wherein, this position of the sharp point decreases the likelihood a bodily-injury by the sharp point. On the side with article 110a of the dividing mechanism, most the article is trapped, hidden, and glued between the two connected sheets of fabric. Furthermore, a warning label and a trademark logo will be heat pressured to this side so that a user is reminded to handle with care. Altogether, this may increase the safety when using the pouch by minor users.

Figure 12:
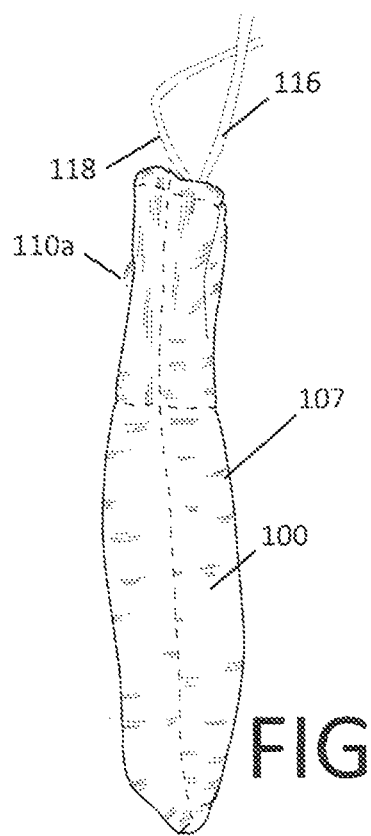
FIG. 12 is a perspective view narrow side of the pouch that is turned inside out, and it is the side where the longitudinal side edges are permanently stitched together.
Figure 13:
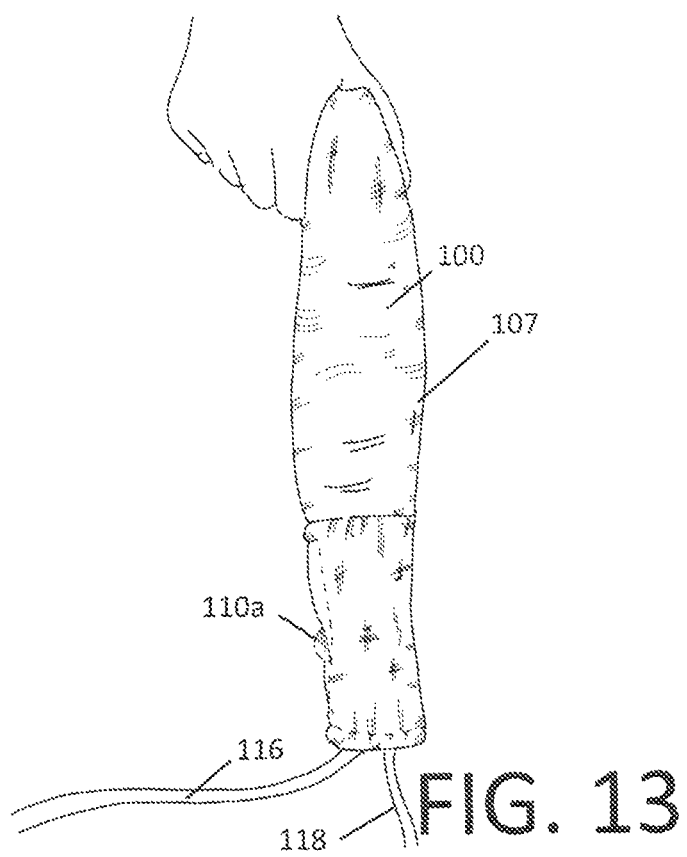
FIG. 13 is perspective view of the other narrow side of an upside down pouch that is turned inside out, where the side is created by folding the sheet of fabric laterally.

With reference to FIGS. 12-13, the two narrow sides of the pouch are illustrated in the two figures. FIG. 12 show the narrow side where a longitudinal edge is stitched together permanently, but the stitches may not be visible because the pouch is turned inside out. FIG. 13 shows the other narrow side that is formed from folding the sheet laterally and no stitches are needed to make this side. In both FIGS. 12 and 13, the pouch is housing the electronic device with two cables connected to ports of the mobile electronic device. The engagement of the dividing mechanism divides a single opening into two smaller openings, with little loss to the total sizes of openings. Nevertheless, the two smaller openings prevent a user to remove the electronic device from the pouch to view and interact with the entire screen of the mobile electronic device. Furthermore, the two openings resulted from engaging the dividing mechanism are openings that permit a user to access and control the mobile electronic device, at the discretion of a user, to answer calls, make calls, listen to audio, record audio, connect to ports, and make commands.

Figure 14:
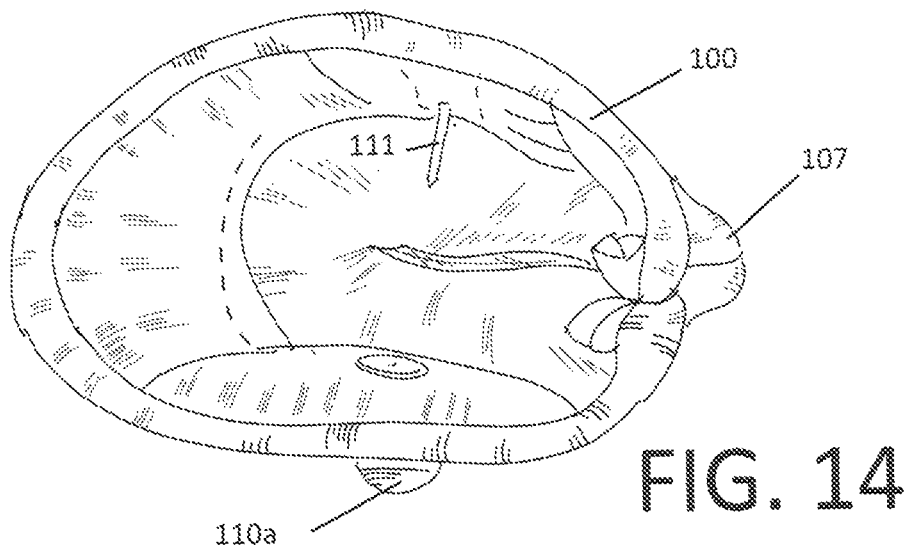
FIG. 14 is a perspective view of the opening of an empty pouch with the dividing mechanism is disengaging, where the rod is inside the pouch and is facing toward inside and toward the other article.
Figure 15:
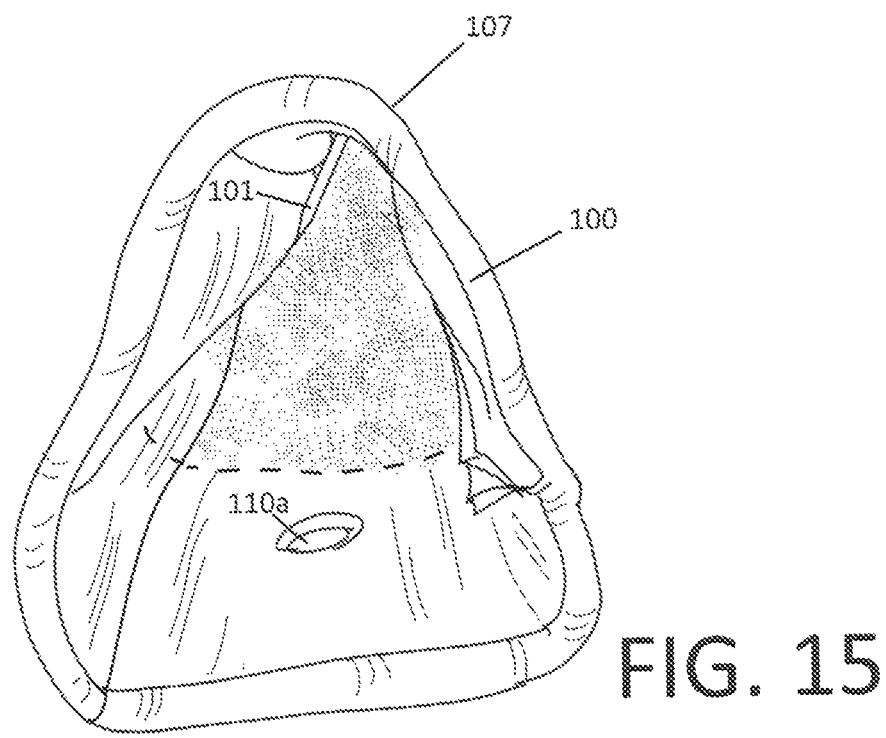
FIG. 15 is a perspective view that shows the stretch ability of the opening the pouch while the dividing mechanism is disengaging.
Figure 16:
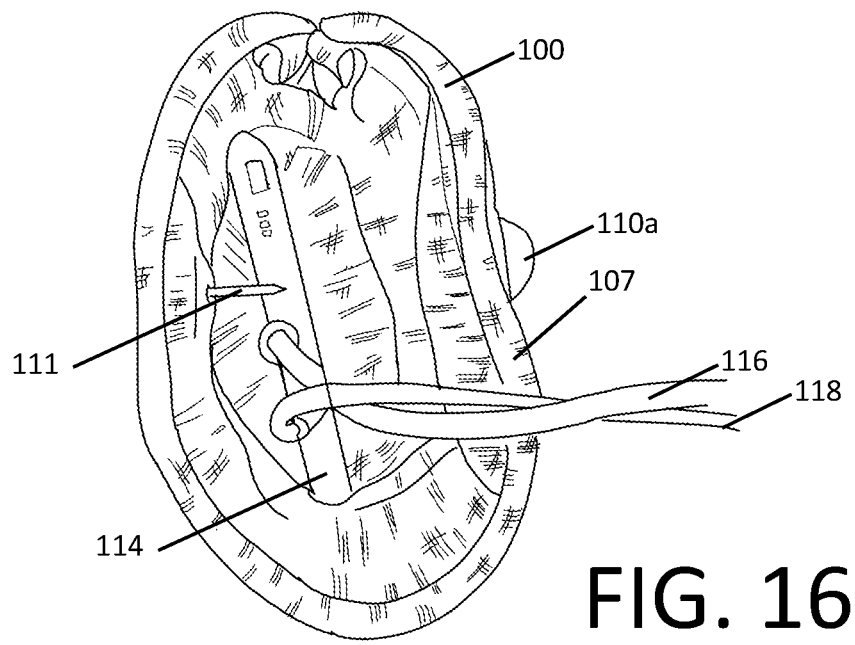
FIG. 16 is a perspective view of the opening of the pouch that is housing the mobile electronic device, and the dividing mechanism is disengaging.
Figure 17:
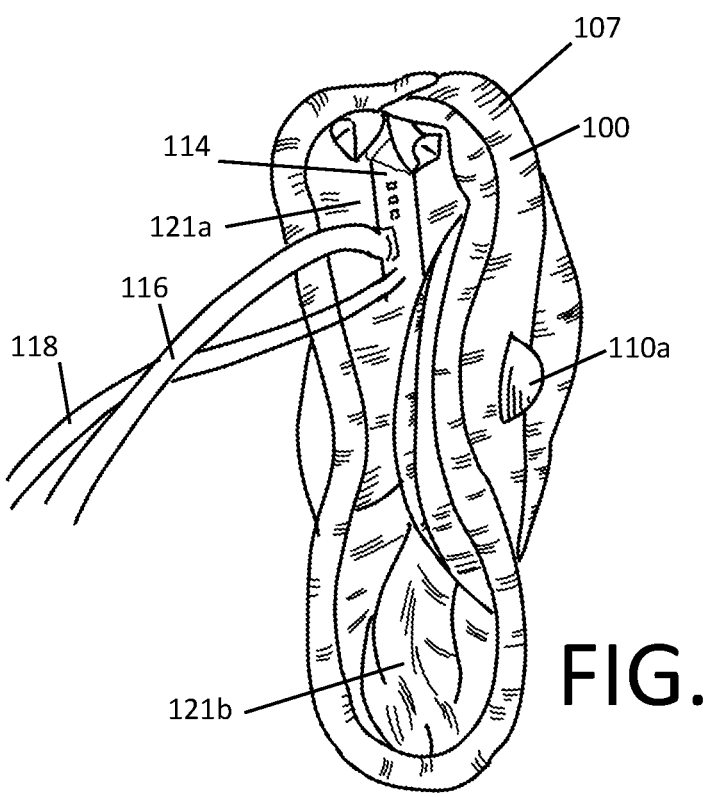
FIG. 17 is a perspective view of the opening of the pouch that is housing the mobile electronic device, and the dividing mechanism is engaging.
Figure 18:
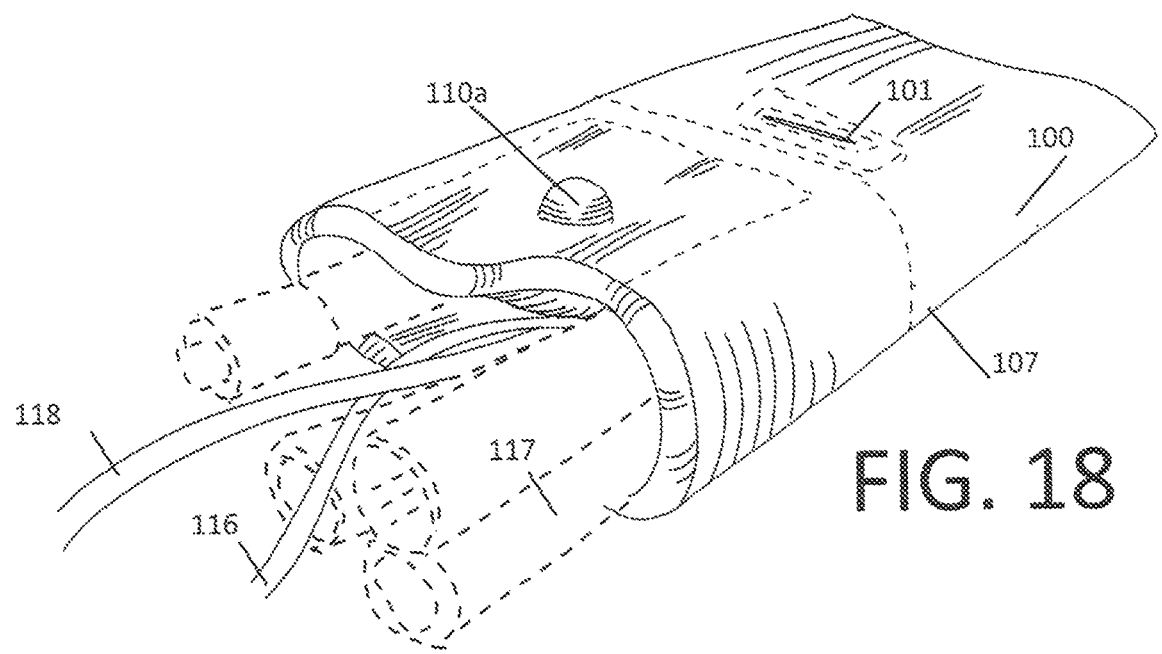
FIG. 18 is a perspective of the pouch housing the mobile electronic device, with dividing mechanism is engaging, and three Expo Marker are inserted in one divided opening and one Expo Marker in another divided opening.
Figure 19:
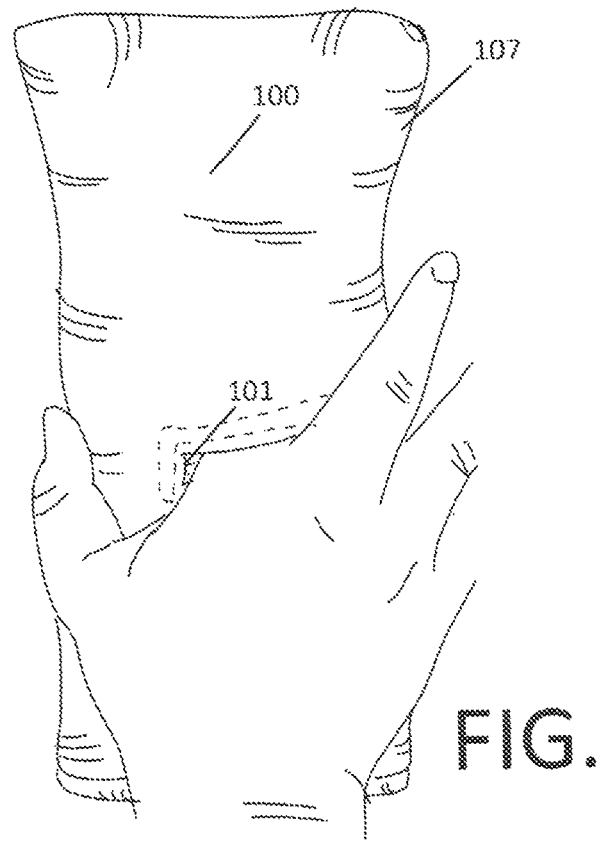
FIG. 19 is a perspective view of the pouch housing the mobile electronic device inside, with the dividing mechanism is engaging, and a user is accessing and controlling the mobile electronic device through the lateral cut.
Figure 20:
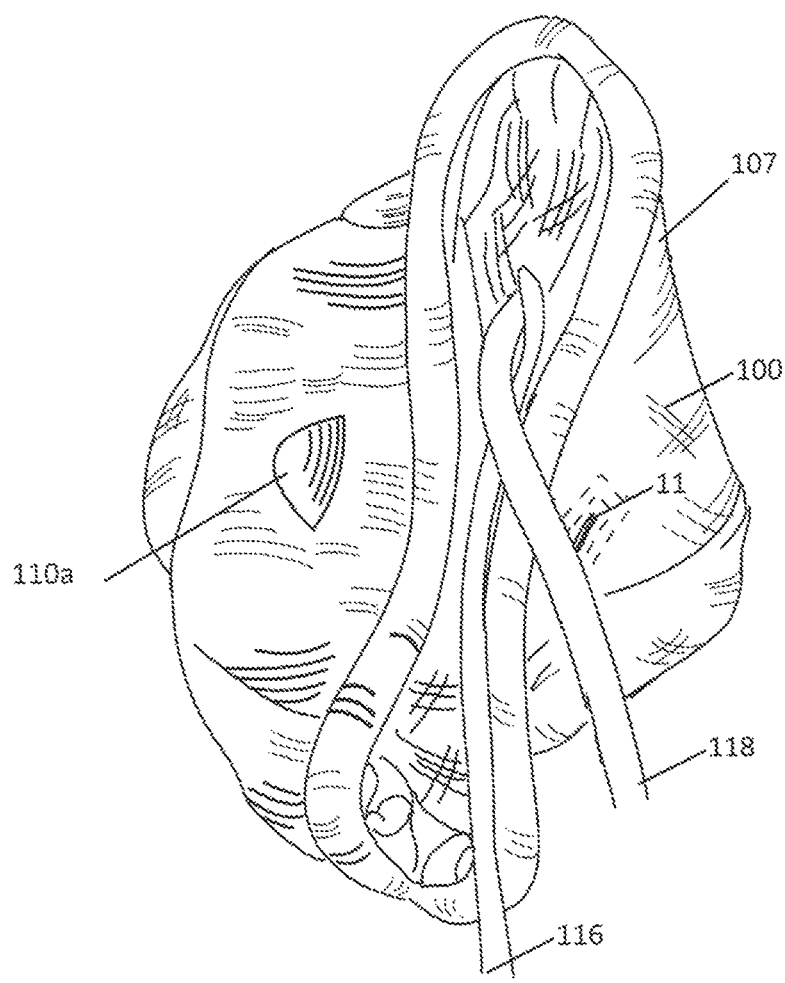
FIG. 20 is a perspective view of the opening of the pouch housing the mobile electronic device that turned 180 degrees inside the pouch.
Figure 21:
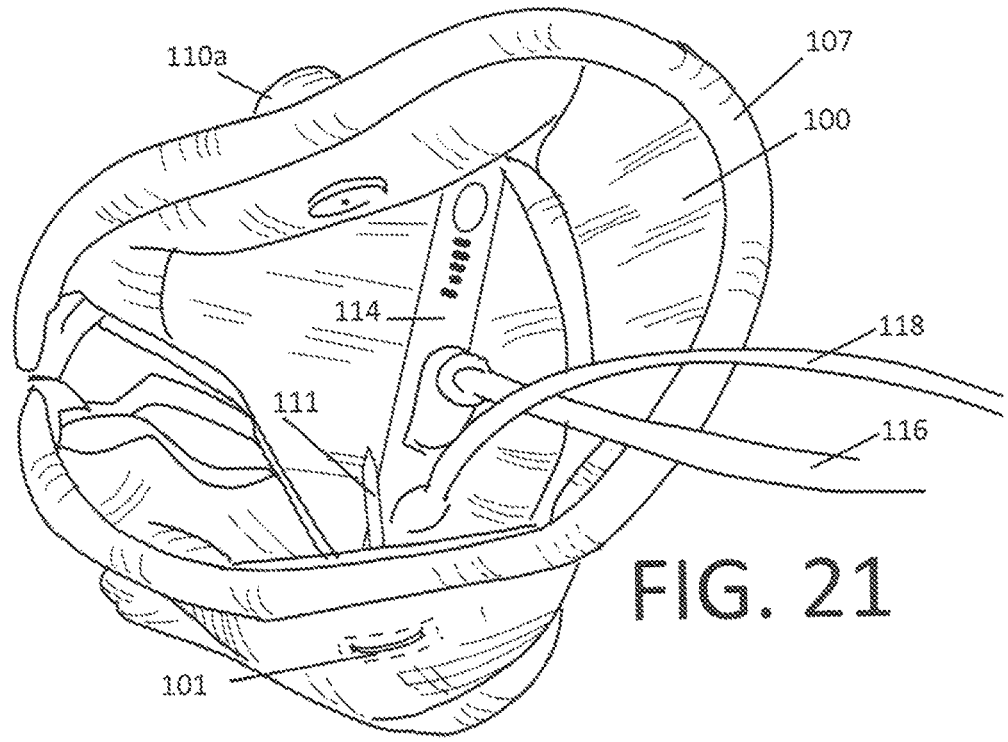
FIG. 21 is a perspective view of opening of the pouch housing the mobile electronic device that is turned 180 degree, and the dividing mechanism is disengaging.

With reference to FIGS. 14-15, both figures illustrates the stretchable fabric of the pouch; wherein the drawings further illustrate the rod 111 is located deep below the opening of the pouch, and it is facing the opening the article 110b of the dividing mechanism. The locations and directions of two articles facing each inside the pouch further illustrate the novel safety features of the pouch. Most importantly, FIGS. 14-15 further distinguished this disclosed invention from case of U.S. Pat. No. 9,819,788, which it comprises a front and rear plates that completely seal the opening the case when the locking means is engaging and further rendering the contained device inaccessible by the user of the device. FIGS. 14-15 also further illustrates the novel feature of the dividing mechanism in this disclosed invention, which allow a user to convert between a single opening and two opening, permitting a user to access and control the mobile electronic device at the discretion of a user, even when dividing mechanism is engaging. This novel advantage is further illustrated in FIGS. 16-17. FIG. 16 illustrates the mobile electronic device 114 is connected to USB cable 116 and headphone cable 118 while it is contained in the pouch with the dividing mechanism is disengaging. FIG. 17 further illustrates the divided opening is large enough so that the mobile electronic device 114 is partially visible and two cables may be connected or disconnected by a user at the user discretion. To further illustrate this novel feature and further distinguish the invention from U.S. Pat. No. 9,819,788, FIG. 18 further illustrated the sizes of the divided openings. FIG. 18 is a drawing of the photograph of the pouch with three EXPO makers inserted in one of the divided opening and another EXPO Marker inserted in other divided opening, wherein the pouch is already housing the mobile electronic device 114 and its two cables 116 and 118. In addition, FIG. 19 further illustrates how the lateral opening further accommodate a user to access and control the mobile electronic device 114 housing inside the pouch. To further illustrates how the dividing mechanism is different from locking means of the case in U.S. Pat. No. 9,819,788, FIGS. 20-21 illustrates the dividing mechanism allowing a user to turn the mobile electronic device 114 housing the device in order to access and control the device at the discretion of a user of the device. With reference to FIG. 17, the figure shows the pouch has two openings when the elongated rod is inserted into the tag. The figure shows the opening 121a on the left side of the rod and another opening 121b on the right side of the rod.

Figure 22:
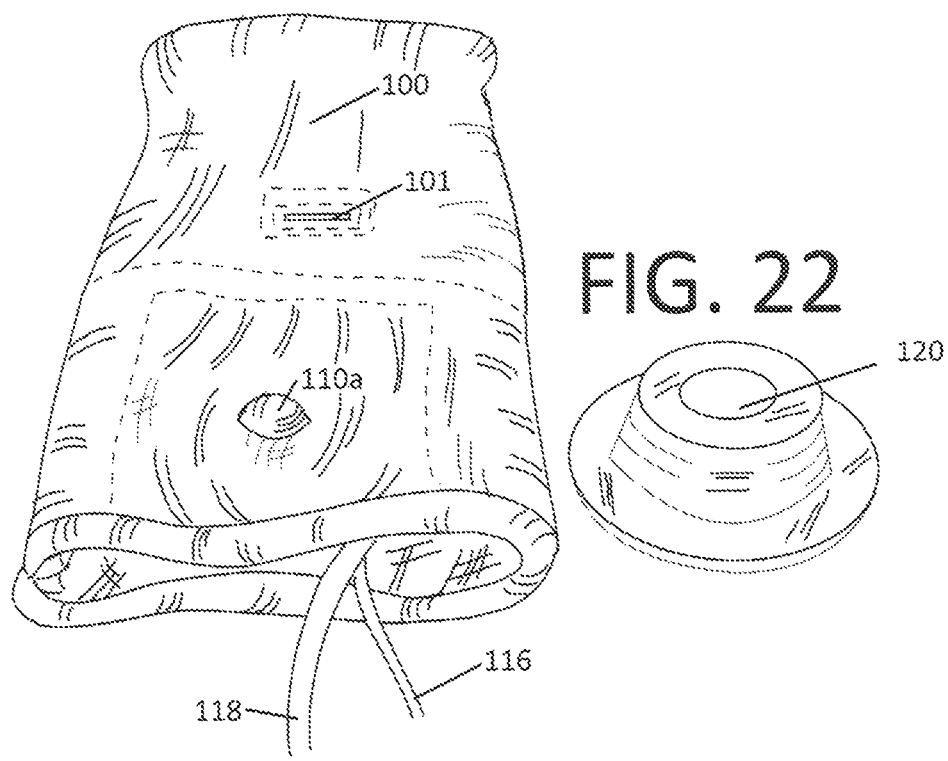
FIG. 22 is a perspective view of the pouch housing the mobile electronic device and a detacher to disengage the dividing mechanism.
Figure 23:
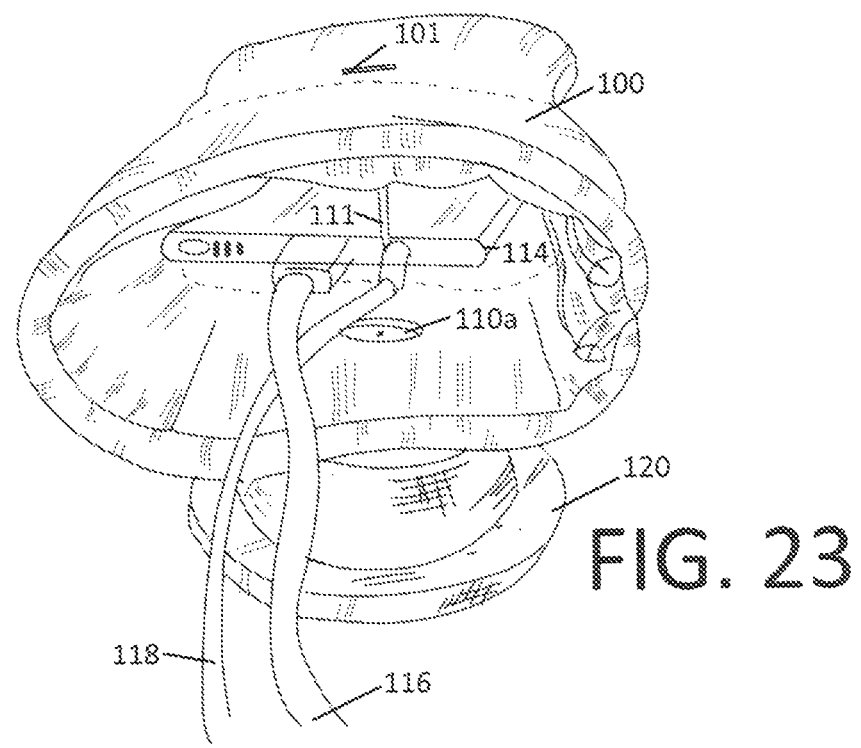
FIG. 23 is a perspective view that show how a detacher disengages the dividing mechanism.

With reference to FIGS. 22-23, the drawings illustrate a method of disengaging the dividing mechanism of the pouch. FIG. 22 illustrates a pouch housing the electronic device inside while the dividing mechanism is engaging, and two cables may be connected or disconnected at the discretion of the user of the mobile electronic device. To disengage the dividing mechanism, a user places the housing part of the article 110a of the dividing mechanism on top of a magnetic detacher. The magnetism of the magnetic detacher releases the rod 111 from the housing article of the dividing mechanism so that a user may pull out the rod 111 to convert the two openings back to a single opening. Therefore, disengaging the dividing mechanism does not require proprietary detacher or key; rather it needs a strong magnet. This ability of a user to disengage the dividing mechanism further permitting a user of the pouch to disengage the dividing mechanism at the discretion of the user. Hence, this further exemplifies the novel featured applications of the pouch as the pouch for temporarily conceal the screen of the mobile electronic device while permitting a user access and control the mobile electronic device at the discretion of a user.

Overall, specific embodiments of, and examples for, the an receptacle with multiple openings for concealing a screen of a mobile electronic device and permitting a user to access and control the mobile electronic device housing inside the pouch, at the discretion of a user, are described in detail and illustrated from photographs of disclosed invention so that those skilled in the relevant art may organize and reproduce. More importantly, the drawings and detailed descriptions of the pouch further distinguish the advantages and novel features of the disclosed invention from any prior arts.

What is claimed is:

1. A pouch to house a mobile electronic device, the pouch comprising:
    a shell constructed of a fabric and defining an interior space, the shell further defining an outer wall with through access openings for a user to access and manually control operation of the mobile electronic device when the device is inserted inside the interior space of the shell;
    a locking mechanism including a tag and a pin, the locking mechanism disposed on the shell at a defined insertion opening of the shell between opposite wall portions of the shell, the insertion opening allows insertion of the mobile electronic device into the shell;
    the locking mechanism including a locking assembly with a passage in the tag to receive an elongated rod of the pin, insertion of the elongated rod into the passage will lock the pin to the tag and secure the opposite wall portions of the shell to each other to partially close the defined opening and leaving two smaller openings of the defined opening on opposite sides of the locking mechanism, the smaller openings preventing removal of the mobile electronic device from the shell, but allowing appropriately smaller accessories to be inserted through the smaller openings into the interior space of the shell.

* * * * *